United States Patent [19]
Granberg

[11] 3,738,200
[45] June 12, 1973

[54] GRINDING APPARATUS AND METHOD

[76] Inventor: Elof Granberg, 201 Nevin Avenue, San Rafael, Calif.

[22] Filed: June 25, 1971

[21] Appl. No.: 156,859

[52] U.S. Cl. .............................................. 76/25 A
[51] Int. Cl. ............................................ B23d 63/16
[58] Field of Search ................. 76/25 A, 37; 279/99

[56] References Cited
UNITED STATES PATENTS

| | | | |
|---|---|---|---|
| 3,354,753 | 11/1967 | Kennemore | 76/37 |
| 2,249,743 | 7/1941 | Bucknam | 76/37 |
| 3,038,355 | 6/1962 | Granberg | 76/31 |
| 1,979,325 | 11/1934 | Goldberg | 279/99 |

*Primary Examiner*—Donald R. Schran
*Attorney*—Bruce & McCoy

[57] ABSTRACT

A grinder for sharpening a saw chain which includes a motor capable of being held in one hand for rotating a grinding element. A frame portion attached to the motor and extending therefrom to a position adjacent the grinding element and including a saw chain alignment means for aligning the angle of the saw chain with respect to the grinding element, to sharpen a saw chain tooth at the proper angle.

4 Claims, 6 Drawing Figures

PATENTED JUN 12 1973
3,738,200
SHEET 1 OF 2
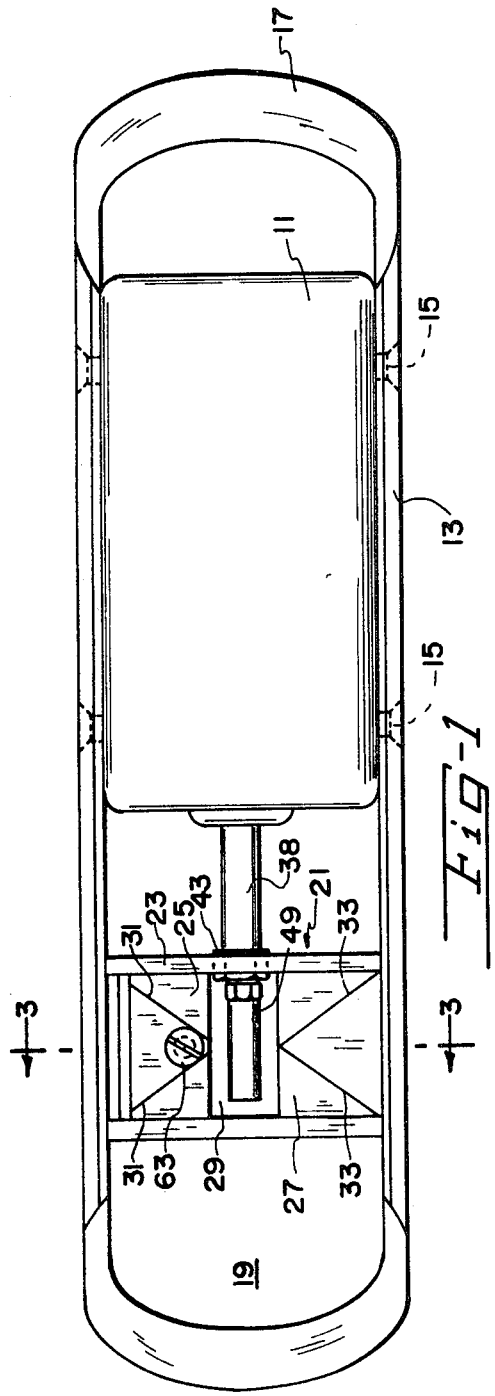
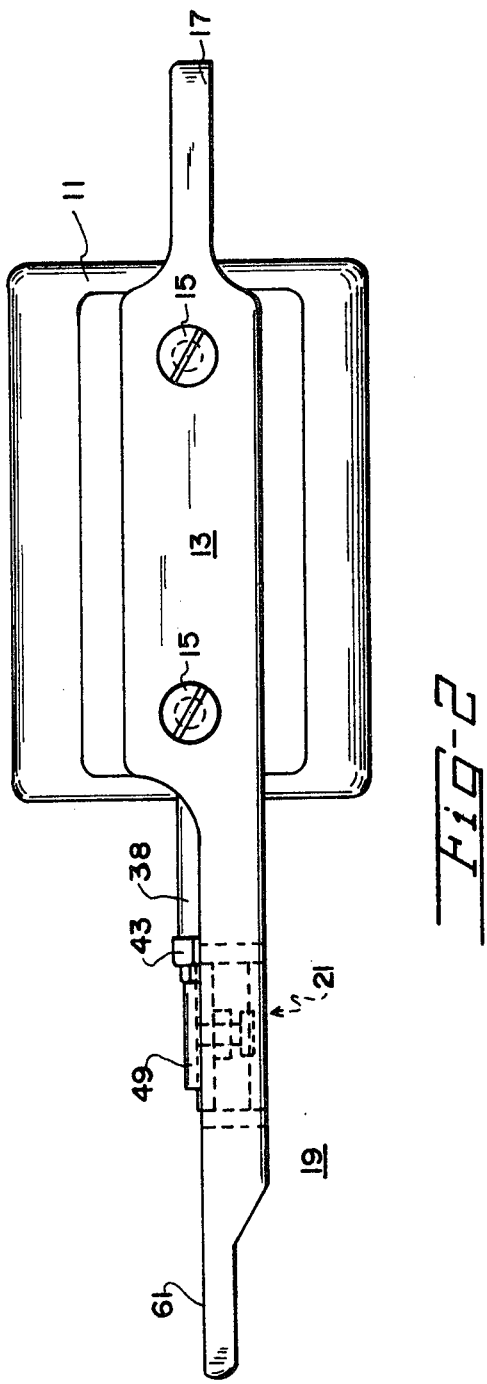
INVENTOR
ELOF GRANBERG
BY Bures & McCoy

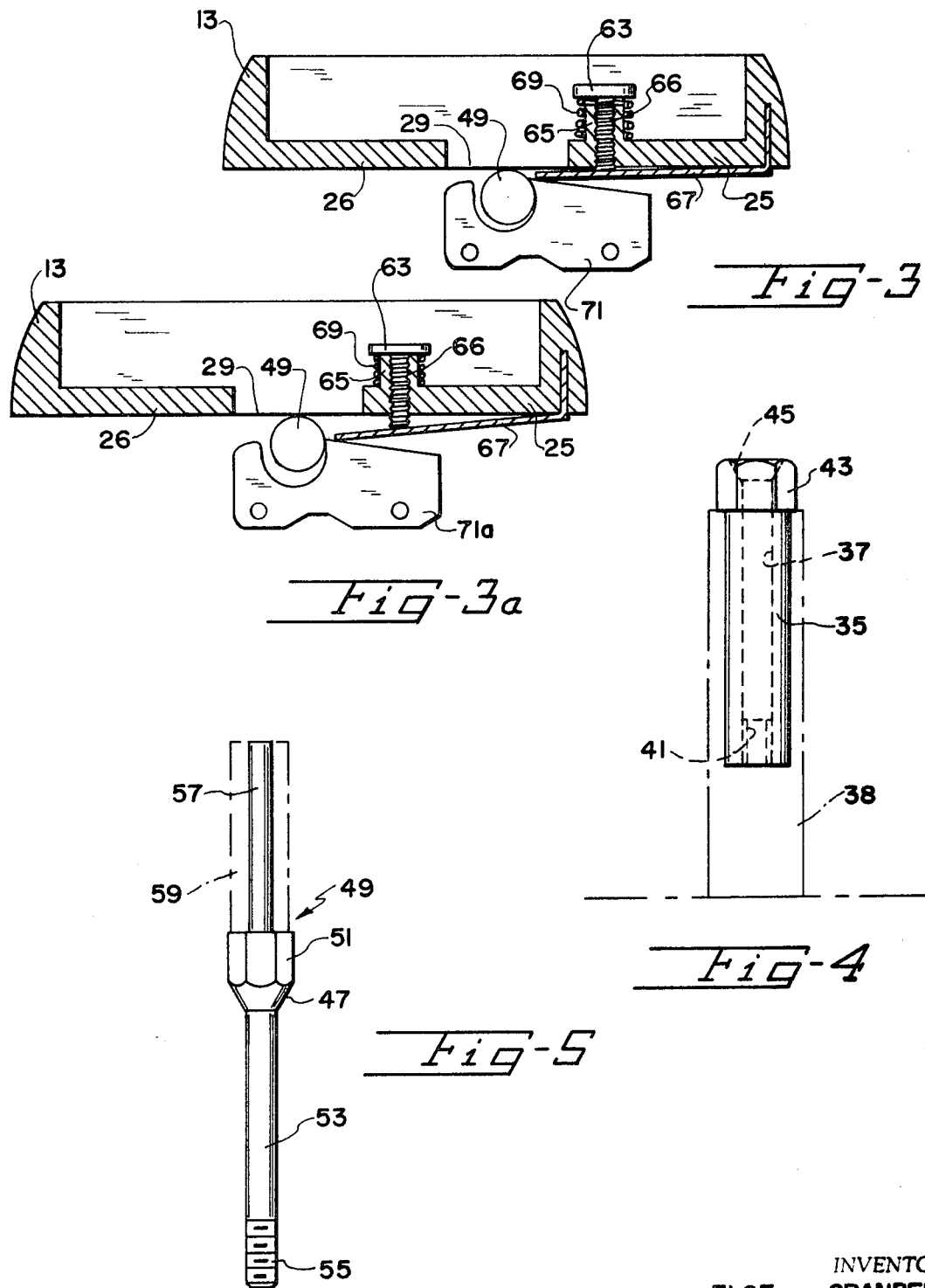

GRINDING APPARATUS AND METHOD

BACKGROUND OF THE INVENTION

1. Field of the Invention

This application relates generally to a rotary grinder sharpening means for the cutting teeth of saw chains. More particularly, it relates to a grinder having a frame for proper positioning of the grinding element with respect to the cutting teeth of a chain saw.

2. Description of the Prior Art

Generally, each cutter link of a saw chain is provided with a depth gauge at the front end of the link and a cutting tooth at the rear end. Most saw chains are designed so that the teeth of each link alternate to cut laterally opposite from the link ahead or behind. Many different chain saw cutting teeth configurations are presently utilized for chain saws, and the different configurations of the cutter links impose stringent requirements on the sharpening of the cutting edges of the teeth. To prevent unsteady cutting conditions from arising in the operation of the saw, which occur as a result of drag and/or wobble, it is necessary that the teeth be accurately and properly sharpened to particular cutting angles and to uniform configuration and size. Furthermore, teeth for cutting woods of different hardness must be sharpened differently.

Saw chains of the type set forth in U. S. Pat. No. 3,366,150, for SAW CHAIN by William Malloff issued Jan. 30, 1968, utilize a sequential cutting operation involving four separate cutting steps, and four different types of cutter links or teeth are used. Each of these four teeth must be sharpened in a different manner at a different angle, normally by hand using a round file.

In addition, each cutting edge is sharpened to meet different cutting edge angle tolerances. Various special tools have been developed for sharpening chain saw cutting teeth because of the necessity that the teeth be accurately sharpened to effect the proper cut to prevent unsteady cutting conditions. An example of such a device is disclosed in applicant's U. S. Pat. No. 3,038,355 for APPARATUS FOR FILING AND JOINTING SAW CHAINS issued June 12, 1962.

The present invention provides a new motor driven type of saw chain sharpening means.

SUMMARY OF THE INVENTION

The present invention comprises a grinder having a motor with a drive shaft secured thereto, a grinder element is secured to the drive shaft to be driven thereby, a frame is fixed to the motor which can be engaged with a saw chain cutting tooth for supporting the grinding element with respect to the cutting tooth for proper sharpening of the cutting tooth.

OBJECTS OF THE INVENTION

It is therefore an object of the present invention to provide a grinder for sharpening the teeth of a saw chain.

It is another object of the present invention to provide a saw chain grinder with means for supporting the grinder with respect to a tooth of the saw chain.

It is another object of the invention to provide a grinder with guiding or indicating means whereby the grinder may be properly held with respect to a tooth to be sharpened.

It is a further object of the present invention to provide the grinder with means for adjusting the height of the grinder relative to a saw chain for sharpening different teeth.

It is yet another object of the present invention to provide a portable, inexpensive, simple-to-use saw chain sharpener which can be operated in the field or at a workbench.

It is yet a further object of the present invention to provide a grinder for sharpening saw chain teeth, which grinder utilizes easily removable and replaceable grinding elements.

It is still a further object of the present invention to provide a chain saw sharpening grinder with detachable grinding elements which may be used as replacements in any of the known grinders now available and which are fixedly held in position during operation of the grinder.

And it is still another object of the present invention to provide a method for sharpening saw chains by utilizing a rotary grinder having guide means associated therewith.

DESCRIPTION OF THE DRAWINGS

Additional objects of the invention will be brought out in the following description of a preferred embodiment of the grinder, taken in conjunction with the accompanying drawings, wherein:

FIG. 1 is a plan view of a preferred embodiment of the grinder of the present invention;

FIG. 2 is side elevation of the grinder of FIG. 1;

FIG. 3 is a section of the saw chain guide taken along line 3—3 of FIG. 1 showing the grinder bit in contact with a tooth;

FIG. 3A is a view similar to FIG. 3 showing the adjustable plate in a further position for sharpening a different saw tooth;

FIG. 4 is an enlarged view of the insert carried in the hollow drive shaft of the motor; and FIG. 5 is an enlarged view of the removable grinding element which is held within the insert.

DESCRIPTION OF THE PREFERRED EMBODIMENT

Reference is made to the drawings for the details of the present invention in its preferred form. The grinder of the present invention comprises a unique rotary grinding element driven by an electrical motor. The rotary grinding element is self locking with the drive shaft of the motor due to the sharpening action of the grinder. An alignment frame is provided adjacent the grinding element for supporting it relative to the cutting edge of the cutter link to aid in the proper sharpening of the cutting edge. An adjustment means is provided on the frame for varying the height of the grinder relative to a saw chain for sharpening different angles on the teeth.

Referring to FIG. 1, there shown is the preferred embodiment of the grinder of the instant invention. The electrical drive motor 11 may be of the self-contained type, having batteries installed therein for use in the field, or it may be provided with a cord having a plug for installation in a normal electrical outlet. It could be provided with clamps for connection to a storage battery.

A frame 13 is fixed to the exterior housing of the motor by any suitable means, such as the slotted cap screws 15 shown. The frame is preferably a unitary element formed in one piece from aluminum or the like, and extends outwardly from both ends of the motor. The motor is nested within the hollow central portion of the frame, and a holding handle 17 is provided at one end thereof to facilitate the carrying and handling of the grinder. The other or second end 19 of the unitary frame preferably extends from the motor for a greater distance than the holding handle 17.

A grinding or indicating means 21 for aligning or holding the grinder at the proper sharpening angle with respect to a saw chain tooth, is provided substantially midway along the second frame end 19 and is formed integrally with the frame, or fixedly secured between the sides of the frame, in any convenient manner. The indicating means includes a pair of side braces 23 having a pair of plates 25,27 fixed in any convenient manner therebetween. As shown, the plates stop short of the central portion of the supporting element to provide a space 29 between the ends thereof.

Each of the plates is provided with a pair of raised or scrolled markings 31,33 substantially in the form of a triangle to be used as the guide means. These markings may be at any desired angle, or the plates 25,27 may be made in the form of triangles having the edges thereof corresponding to the desired angle. The angle of the markings 31,33 is determined by the angle of the cutting edge it is desired to provide on the tooth of a saw chain. During sharpening of the cutting teeth, one of the marks is aligned with the centerline of the saw chain as a guide for proper sharpening. It should be noted that preferably each pair of markings 31,33 are at equal angles to the grinding element to enable it to be properly aligned with the alternating teeth of a cutting chain. One line of each pair of markings is also made parallel to the diagonally opposite line of the other pair. The spacing or distance between each of these parallel lines is substantially equal to the width of a saw chain. Therefore, when the saw chain is aligned between one pair of parallel lines, the grinder is then in the proper position to sharpen a tooth of the saw chain, and the alignment can be visually maintained.

The drive shaft 38 of the motor 11 has a removable hollow insert 35 secured therein such as by force fit. The insert has a bore 37 extending therethrough. The insert includes a threaded inner portion 41 at the inner end and an enlarged multisided head portion 43 at the outer end. The lower surface of the head portion 43 of the insert seats against the end of the drive shaft and includes an enlarged bore or countersink 45 formed for receipt of a tapered end portion 47 of a grinding bit or element 49.

The grinding bit includes an enlarged multisided intermediate portion 51, from which the tapered portion 47 extends, and a connecting shaft 53 having external threads 55 formed at the free end thereof. The connecting shaft is of such a diameter that the grinding bit may be held in any of the known grinders having a universal chuck by insertion of the shaft in the chuck or holding means thereof. The upper face of the intermediate portion 51 of the shaft is provided with a reduced portion 57 to which an abrasive material 59 can be molded for forming the rotary grinding bit. In a preferred embodiment of the invention, the grinding material 59 is composed of conventional grinding material secured together by a binder, and the bit may vary in diameter from one-fourth inch up to 5/32 inch or more depending on the diameter and angle of the saw tooth to be sharpened.

As shown, the threaded end 55 of the connecting shaft 53 is threaded into the internal thread 41 of the insert disposed at the inner end thereof. In the assembled position, the tapered portion 47 of the element seats against the counter-sunk hole 45 of the insert with the rotary grinding bit extending over the space 29 between the blades 25,27. The grinding bit 49 preferably rests entirely within the space 29 with the enlarged head 43 of the drive shaft aligned with the brace 23 adjacent the motor.

As more clearly shown in FIGS. 2 and 3, the frame 13 is so formed that the upper face 61 of the extending end portion 19 is below the center line of the motor a predetermined distance, whereby the grinding bit 49 extends thereabove. The portion of the frame 13 attached to the motor housing is preferably enlarged so as to form a gripping portion for the hand of a user and tapers down to the narrow extending end portions 17,19, shown.

An adjustment means is provided to enable teeth having different length cutting edges to be sharpened. For cutting hard or soft woods, a different angle of bite is required on the cutting tooth. The adjustment means to permit forming of these different angles includes a thumbscrew 63 threadedly mounted in the plate 25. A threaded portion 65 of the thumbscrew passes through a tapped hole formed within a raised portion 66 formed on the plate. A secondary leaf plate 67 is preferably fixed to the frame 13 on the side opposite the side of plate 25 on which the indicating marks are formed. This secondary plate may be adjusted relative to plate 25 by turning the thumbscrew in either direction to bend the leaf plate. A spring 69 mounted over portion 66 between the head of the thumbscrew and the plate 25 is provided for retaining the thumbscrew in its adjusted position. The movement of leaf plate 67 is caused when the tip of the threaded portion 65 acts against the end of the leaf plate to move or rotate this end of the plate with respect to the end thereof fixed within frame 13. In this manner, the height of the grinding element relative to a saw chain over which or on which it is placed may be adjusted. Therefore, the angle and/or amount of a saw chain tooth 71, 71a coming into contact with the rotating bit 49 is adjusted with respect to the grinding bit. This allows different types of teeth to be sharpened and insures that the height of the grinding element relative to the saw chain is correct.

The present invention allows the teeth of a saw chain to be sharpened by a rotating grinding element and insures that the grinder is properly positioned with respect to the saw chain tooth to be sharpened. The grinding bit or element is properly aligned with the tooth to be sharpened when the saw chain is aligned in the space formed between a pair of parallel guide lines or markings 31,33 provided on each plate 25,27. The threads are formed in such a manner that when the motor 11 is started, the threaded engagement between the insert and the element will be tightened further, thereby seating the tapered portion 47 more securely against the countersunk portion 45 and more firmly holding the grinding bit 49 within the insert 35.

It therefore can be seen that an important feature of the present grinder is its ability to accurately sharpen many different cutting tooth configurations by means of a hand held powered device. It is therefore believed to be obvious that the present design is easier to operate than known tooth sharpening means for use in the home, the factory, or in the field.

Furthermore, since the rotating grinding bit is easily removable, any size grinding bit may be inserted into the unique hollow combination drive shaft and holding means, or the grinding bit may be used in the chuck or other holding means of known grinders.

Obviously many modifications and variations of the present invention are possible in the light of the above teachings. It is therefore to be understood that, within the scope of the appended claims, the invention may be practiced otherwise than as specifically described.

What is claimed is:

1. A grinder, comprising
   a motor,
   a drive shaft secured to said motor,
   a grinding element secured to said drive shaft and driven thereby,
   a frame fixed to said motor which can be engaged with a saw chain cutting tooth for supporting the grinding element with respect to said cutting tooth for proper sharpening of the cutting edge of said tooth, and
   a pivotable plate fixed to said frame and adjustable with respect thereto whereby the height of the grinding element relative to the saw chain teeth may be changed to enable saw chain teeth of different dimensions to be sharpened by varying the angular relations of the plate to the frame when said plate is resting on a saw chain tooth.

2. A grinder for sharpening saw chains, comprising:
   a motor;
   a drive shaft having an insert with a bore extending therethrough held in said drive shaft, said bore having threads formed internally thereof adjacent said motor;
   an elongated holding shaft threaded at one end insertable into said insert and held by said internal threads, said holding shaft having an enlarged intermediate portion resting against a countersunk portion formed in the free end of said insert, the remaining portion of said holding shaft, between said enlarged intermediate portion and other end thereof, having an abrasive material secured thereto to form a cylindrical grinding portion;
   a frame secured to said motor and extending outwardly therefrom to form a holding section at one end of said motor and a guiding section at the other end of said motor adjacent said grinding portion, said guiding section of said frame including alignment means for aligning the angle of a saw chain with respect to said grinding portion, whereby, when said grinding portion is rotated by said motor and brought into contact with a tooth of said saw chain, said tooth will be properly sharpened; and
   a pivotable plate fixed to said frame and adjustable with respect thereto whereby the height of the grinding element relative to the saw chain teeth may be changed to enable saw chain teeth of different dimensions to be sharpened by varying the angular relations of the plate to the frame when said plate is resting on a saw chain tooth.

3. The grinder of claim 1 wherein said frame is a unitary element having a hollow central portion, and said motor is nested in said hollow central portion with the ends of said frame extending outwardly from both ends of said motor as hand holds.

4. The grinder of claim 1 including a thumb screw adjustably held in said frame and coacting with said plate to cause pivotable movement and changing the angular relation of said plate to said frame upon adjustment of said thumb screw.

* * * * *